United States Patent
Aiello et al.

(10) Patent No.: US 6,867,634 B2
(45) Date of Patent: Mar. 15, 2005

(54) METHOD FOR DETECTING THE NULL CURRENT CONDITION IN A PWM DRIVEN INDUCTOR AND A RELATIVE DRIVING CIRCUIT

(75) Inventors: Natale Aiello, Trecastagni (IT); Francesco Giovanni Gennaro, Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 10/438,192

(22) Filed: May 14, 2003

(65) Prior Publication Data

US 2004/0036450 A1 Feb. 26, 2004

(30) Foreign Application Priority Data

May 15, 2002 (EP) .............................................. 02425295

(51) Int. Cl.[7] .............................. H02J 3/00; G05F 1/66
(52) U.S. Cl. ....................... 327/335; 323/355; 323/363; 327/520; 327/563; 327/581
(58) Field of Search ...................... 323/205, 207–210, 323/299–301, 355, 363; 327/335, 520, 518, 530, 531–532, 544, 563, 581

(56) References Cited

U.S. PATENT DOCUMENTS 5,463,306 A    10/1995    Berry et al. ................. 323/222

FOREIGN PATENT DOCUMENTS

EP        0507393      3/1992      .......... H02M/3/156

*Primary Examiner*—Evan Pert
(74) *Attorney, Agent, or Firm*—Lisa K. Jorgenson; Allen, Dyer, Doppelt, Milbrath & Gilchrist, P.A.

(57) ABSTRACT

A method for detecting a null current condition in a PWM driven inductor connected between a voltage source node and a second circuit node of a line for outputting current to a load includes generating a derivative signal by time differentiating a voltage on the second node. The method further includes monitoring an instant when the derivative signal becomes negative, and signaling verification of the null current condition each time the derivative signal becomes negative.

25 Claims, 5 Drawing Sheets

METHOD FOR DETECTING THE NULL CURRENT CONDITION IN A PWM DRIVEN INDUCTOR AND A RELATIVE DRIVING CIRCUIT

FIELD OF THE INVENTION

The present invention relates to switching circuits, and more particularly, to a method for detecting a null current condition in a PWM driven inductor, and a related driving circuit implementing such a method.

BACKGROUND OF THE INVENTION

Switching circuits using reactive components, such as inductors and capacitors, are increasingly used for converting power. These converters may be characterized by those that use a PWM driven inductor. This inductor has one terminal coupled to a rectified voltage supply line, and another terminal coupled to a PWM drive switch. One or more switches alternate between conduction phases and cut-off phases causing the inductance to absorb energy from the supply during the conduction phase, and release it to a load circuit during the successive cut-off phase.

One of the problems that is encountered in forming these circuits is that of precisely determining the instant in which the switch must be switched on. Often, this switching takes places when the current in the inductor becomes null in order to charge again the inductor after it has delivered to the load all of its stored energy.

This situation is encountered, for example, in power supplies using converters functioning at a high frequency. These converters are used for reasons of space and costs, and are often preferred because they do not require the use of transformers for the mains voltage. Because of their widespread use and importance, in the following description reference will be made to power supplies using DC-DC switching converters for highlighting the addressed technical problem. However, the considerations that will be made hold for any circuit using a PWM driven inductor, that is, the current in the inductor becomes null between two consecutive switchings toward the voltage source.

Many of the current electronic devices are powered by power supplies that are directly connected to the mains voltage, as depicted in FIG. 1. The mains voltage is rectified by a rectifying bridge, and then filtered with a relatively large capacitor $C_{BULK}$. As may be noticed in FIG. 2, the current absorbed from the mains voltage is discontinuous because it is absorbed only when charging the capacitor $C_{BULK}$, thus raising the voltage $V_{Cbulk}$.

These power supplies cause a strong harmonic content of the mains current, which reduces the power factor. Enforced "power quality" specifications impose the use of circuits that correct the non-linearity of the current absorbed from the mains voltage by making it almost sinusoidal for remaining below a certain maximum tolerable limit having a harmonic content.

There are many techniques for improving the power factor. Some techniques contemplate the use of passive networks using capacitors and inductors. Other techniques contemplate the use of active circuits for correcting the power factor. In the latter case, which is the case of interest, the power supply has one or more switches that are switched for charging the bulk capacitor during the whole half-wave of the AC network voltage by absorbing current at high frequency and at a level proportional to the instantaneous value of the mains voltage.

As is well known to those skilled in the art, there are different topologies of power factor correction circuits, and each of them has advantages and drawbacks depending on the output power. One of the most used topologies for circuits having an output power less than 80 W is the so-called "Boost" topology with TM (Transition Mode) control, with a fixed turn on time $T_{ON}$ and variable frequency.

The power supply of FIG. 3 is formed by a rectifying bridge that rectifies the AC mains voltage, a power factor correction circuit PFC, a bulk capacitor $C_{BULK}$, and a converter CONVERTER which may be a DC-DC or a DC-AC. The power factor correction circuit PFC, which in the considered case has a boost topology, has an inductor L driven in a PWM mode by a switch SW turned on or off by a driving circuit DRIVER. A clamping diode D prevents an inversion of the current that flows from the voltage source toward the converter.

FIG. 4 depicts the waveform of the current flowing in the inductor L. The switch SW is turned on only after the current in the inductor has become null, and is successively turned off to let the inductor deliver current toward the load. In this way the mean value of the absorbed current is sinusoidal.

According to a transition mode TM control, the switch SW remains in a conduction state for a constant time $T_{ON}$, the value of which depends on the load. The value of the current circulating in the inductor L when this time interval expires is $$I = \frac{V_{IN}}{L} \cdot T_{ON}$$

The inductor is turned off and the stored energy: $E=\frac{1}{2} \cdot L \cdot I^2$ is transferred through the clamping diode D to the bulk capacitor $C_{BULK}$ in the form of a charging current (discharging current of the inductance). The switch is turned on again when energy transfer is completed, that is, after the current in the inductor has become null.

Generally, two alternative techniques are used for detecting the null current condition in the inductor. One technique is connecting in series to the inductor a sensing resistance and monitoring the voltage drop on it. The other technique forms an auxiliary winding magnetically coupled to the inductor L and uses the induced signal on the auxiliary winding for determining the turn on instant of the switch.

Both techniques have the following drawbacks. The first technique implies a power dissipation on the current sensing resistor, and as a consequence, a reduction of the efficiency of the system. The second technique requires the use of a transformer, which consequently increases cost. None of these techniques are amenable to a complete integration on silicon.

SUMMARY OF THE INVENTION

An object of the present invention is to provide a method for detecting a null current condition in an inductor driven in a switched mode that, differently from the known methods, can be implemented in circuits that are fully integrated on silicon with significant advantages in terms of simplification and cost.

In circuits using a PWM driven inductor, a first terminal is coupled to a voltage source node, and a second terminal is coupled to a line for outputting a current toward a load and to a driving switch that alternates conduction phases and non-conduction phases. When the current in the inductor becomes null, there is a drop of the voltage on the second terminal of the inductor which becomes equal to the voltage present on the first terminal.

By detecting this occurrence for establishing a nullification of the current circulating in the inductor, important advantages may be achieved in terms of simplifying the circuit and for allowing the realization of the entire driving circuit in an integrated form. This is because the use of a current sensing resistor or an auxiliary winding is no longer required.

Another object of the invention is to provide a method for detecting the null current condition in a PWM driven inductor having a first terminal connected to a voltage source node and a second terminal connected to a line for outputting current toward a load. The method comprises time differentiating the voltage on the second terminal of the inductor for generating a time derivative signal, monitoring an instant when the derivative signal becomes negative, and signaling the nullification of the current flowing in the inductor each time the derivative signal becomes negative. The voltage on the second terminal of the inductor may also be filtered before being differentiated.

Another object of the present invention is to provide a PWM driving circuit for an inductor while detecting the nullification of the current flowing in the inductor. The PWM driving circuit has a first terminal connected to a voltage source node and a second terminal connected to a line for outputting current toward a load. A power switch is connected between the second terminal and a ground node of the circuit, a PWM control circuit is connected to the switch and operates as a function of load conditions, and a bistable output stage is coupled to a control terminal of the power switch.

The driving circuit of the invention may also comprise a differentiating line or stage coupled to the second terminal of the inductor. A derivative signal is produced by the differentiating stage when the voltage on the second terminal of the inductor drops because of the nullification of the current circulating in the inductor that has become negative. This causes the switching of a monitoring circuit that in turn sets the bistable output circuit, and thus turns on the power switch.

The driving circuit of the invention allows the formation of boost converters and power factor correction circuits for power supplies without requiring external components (non-integrable components), such as current sensing resistors or auxiliary windings magnetically coupled to the inductor for detecting a null current condition in the inductor.

BRIEF DESCRIPTION OF THE DRAWINGS

The different aspects and advantages of the invention will become even more evident through a detailed description of embodiments of the invention and by referring to the attached drawings, in which.

DETAILED DESCRIPTION OF THE PREFERRED EMBODIMENTS

It has been observed that, in boost converters and power factor correction circuits, characterized by comprising a PWM driven inductor having a first terminal connected to a voltage source node and a second terminal connected to a line for outputting current toward a load, that when the current in the inductor becomes null, the voltage on the second terminal diminishes and becomes equal to the voltage on the first terminal. This voltage may correspond to a rectified mains voltage node, for example.

According to the method of the present invention, the null current condition in the inductor is effectively detected by time differentiating the voltage on the second terminal, and causing the signaling of a null current condition when the time derivative signal becomes negative because of a drop of the voltage on the second terminal. If the voltage on the second node is excessively noisy for causing false null current verifications, it may be filtered before being differentiated.

To better illustrate the peculiarity of the driving circuit of the present invention, an application to a common boost converter will be described in detail, but the considerations that will be made hold for any other circuit employing a PWM driven inductor.

Figure 1:
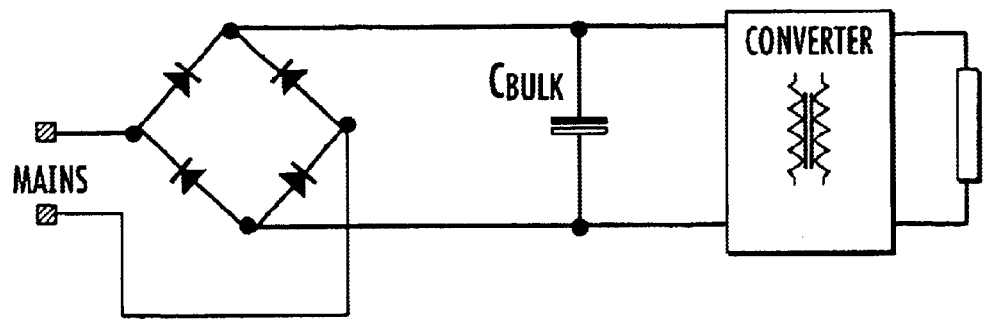
FIG. 1 is a basic block diagram of a power supply in accordance with the prior art.
Figure 2:
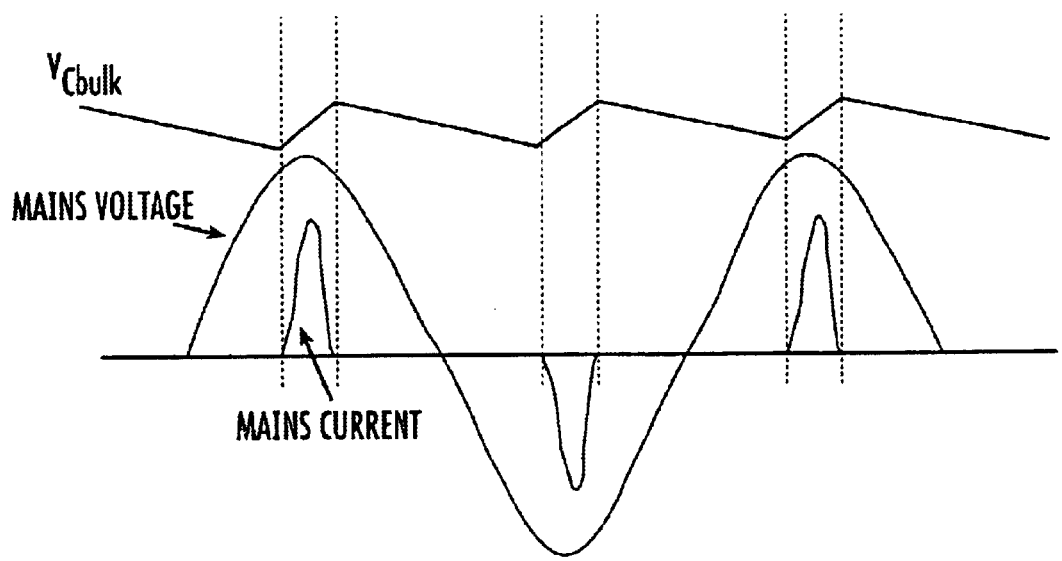
FIG. 2 is a plot of various waveforms illustrating electrical quantities of the circuit of FIG. 1.
Figure 3:
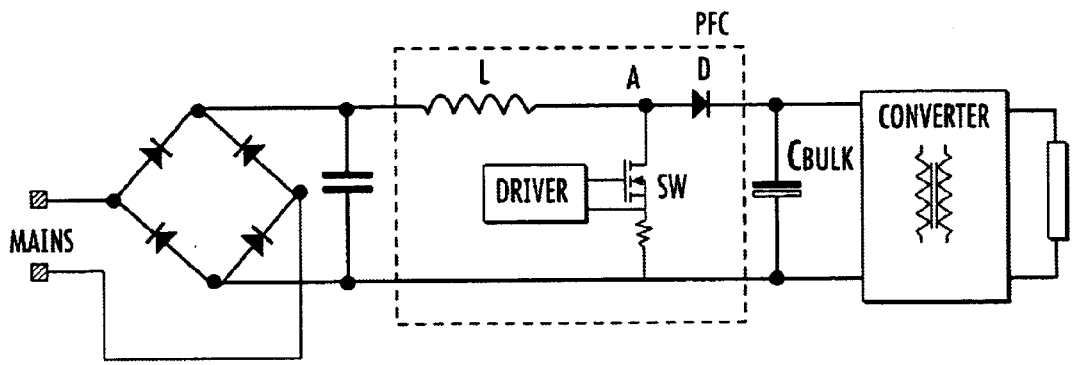
FIG. 3 is a basic block diagram of a power supply provided with a power factor correction circuit in accordance with the prior art.
Figure 4:
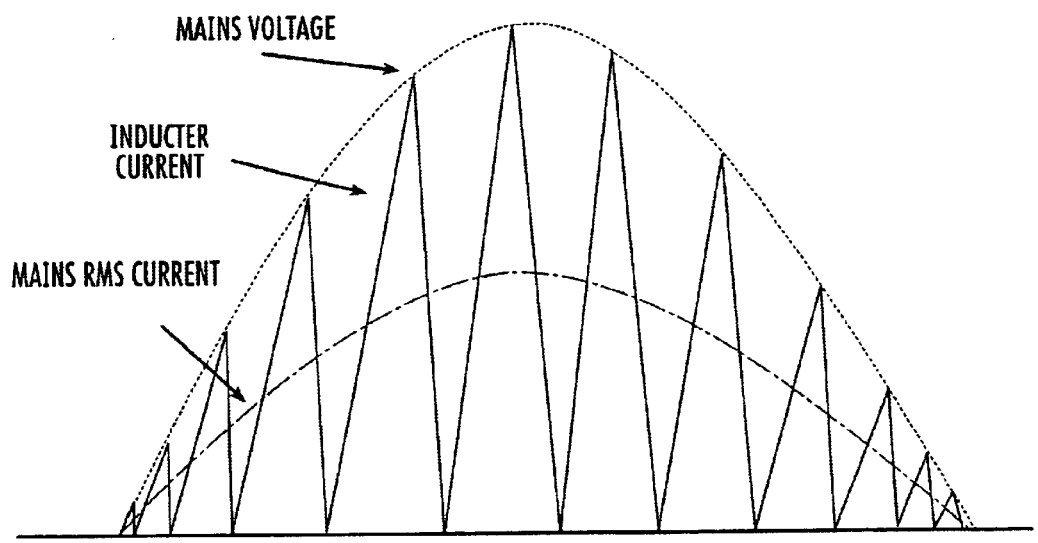
FIG. 4 is a plot of various waveforms of signals of the circuit of FIG. 3 when controlled in a transition mode (TM)
Figure 5A:
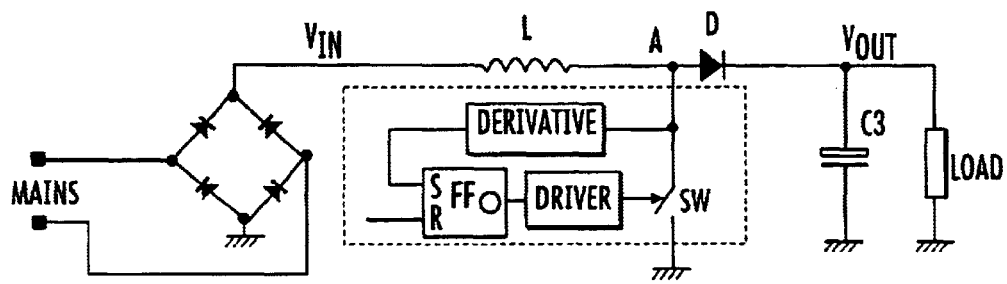
FIGS. 5a and 5b are basic block diagrams of power supplies embodying the driving circuit of the present invention.

FIG. 5a is a basic block diagram of a power supply based on a boost converter that uses the driving circuit of the invention (enclosed by the dashed line). A rectifying bridge rectifies the AC mains voltage and provides a rectified voltage to a boost converter that drives an electrical load LOAD.

Figure 5B:
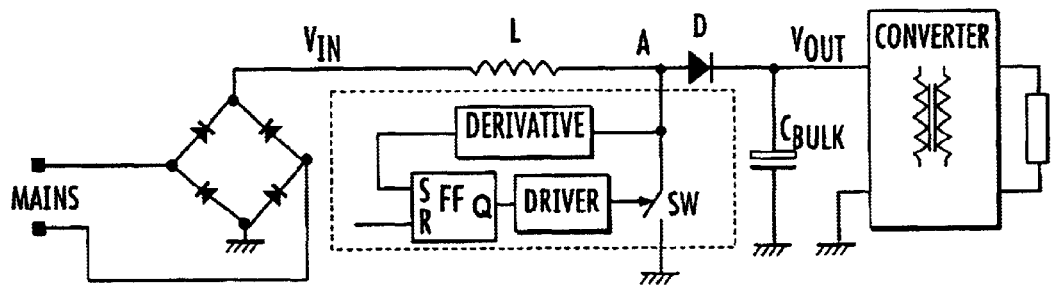

FIG. 5b is a basic block diagram of a power supply that includes a power factor correction circuit using the driving circuit of the invention, a bulk capacitor $C_{BULK}$ and a converter, which can be either a DC-DC or an AC-DC converter.

Referring to FIGS. 5a and 5b, it is assumed that the switch SW is in a conduction state. The inductor L is charged for a time that depends on the load conditions, and as a consequence, a current whose maximum value is a function of the instantaneous input voltage (rectified voltage) that flows in the inductor.

The switch is commanded to an off state by applying a voltage on the reset input R of the flip-flop FF. During this off phase, the energy stored in the inductor is transferred to the capacitor C in the form of a charge current flowing through the clamping diode D.

This happens only if the voltage on the second node A of the second terminal of the inductor is:

$$V_A = V_{OUT} + V_{BE} > V_{IN}$$

where $V_{IN}$ is the instantaneous rectified voltage at the output of the rectifying bridge, and $V_{BE}$ is the base-emitter voltage of the power switch SW.

The voltage $V_A$ is substantially constant when the inductor transfers energy toward the load. In this time interval, which is a function of the voltage difference on the terminals of the inductor L, the current in the inductor decreases from the value reached at the end of the previous charging phase, until it becomes null. When this current becomes null, the voltage on the node A drops, becoming equal to the rectified input voltage $V_{IN}$.

Figure 6:
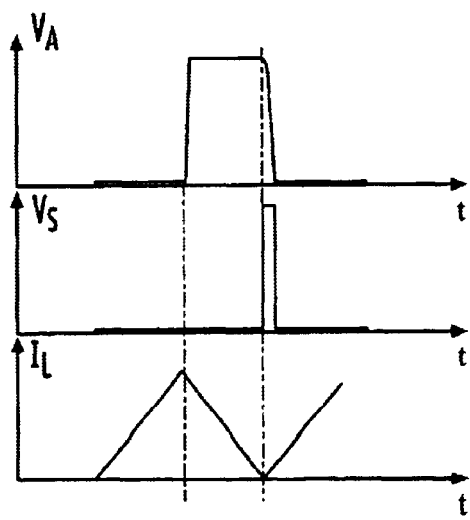
FIG. 6 is a plot of signal waveforms for the circuits of FIGS. 5a–5b.

FIG. 6 depicts the main signals of the power supplies of FIGS. 5a and 5b. When the current $I_L$ in the inductor becomes null, the voltage $V_A$ on the node A decreases. The block DERIVATIVE that includes a time differentiating capacitor of the voltage $V_A$ outputs a pulse V that sets the bistable circuit FF when the time derivative of the voltage $V_A$ becomes negative. The bistable circuit FF set by the pulse V provides a logic signal Q to the control circuit DRIVER, which turns on the switch SW for restarting a new charge phase of the inductor L.

Figure 7:
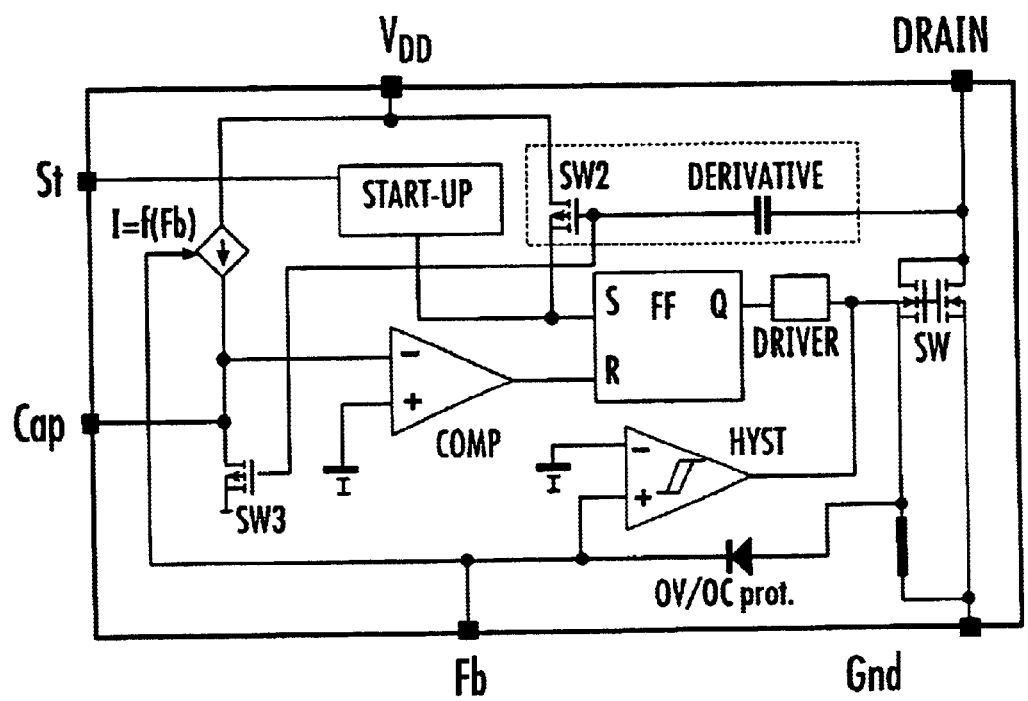
FIG. 7 is a block diagram of a preferred embodiment of an integrated device in accordance with the present invention.

FIG. 7 shows a preferred embodiment of a driving circuit of the invention in the form of an integrated device. The pin DRAIN is connected to the terminal of a PWM driven inductor, that is, to the node A of the line for outputting current toward the load. Customarily, the device has a pin GND for a ground connection, a supply pin VDD for connection to a power supply and other pins ST, CAP and FB whose function will be illustrated below. The depicted driving circuit comprises a bistable circuit FF, a power switch SW and a driver stage DRIVER of the power switch.

According to this embodiment, the time differentiating element of the block DERIVATIVE is basically a capacitor connected between the DRAIN node and the gate of a second switch SW2 that switches the set input S of the bistable circuit FF to the supply voltage VDD.

When the voltage on the node DRAIN drops because of the nullification of the current in the inductor, the differentiating capacitor absorbs current (i.e., the derivative signal becomes negative) from the gate of the switch SW2 which turns on, thus momentarily coupling the set input S of the bistable circuit FF to the supply voltage VDD of the circuit. The output Q of the bistable circuit FF switches to an active state for turning on the power switch SW.

A distinction from similar known driving circuits is that the circuit of the invention does not require any sensing resistor to be connected in series to the inductor, or any auxiliary winding magnetically coupled to it. Moreover, the time differentiating block DERIVATIVE can be integrated on the same chip as the power switch SW and the relative control and drive circuitry.

Figure 8:
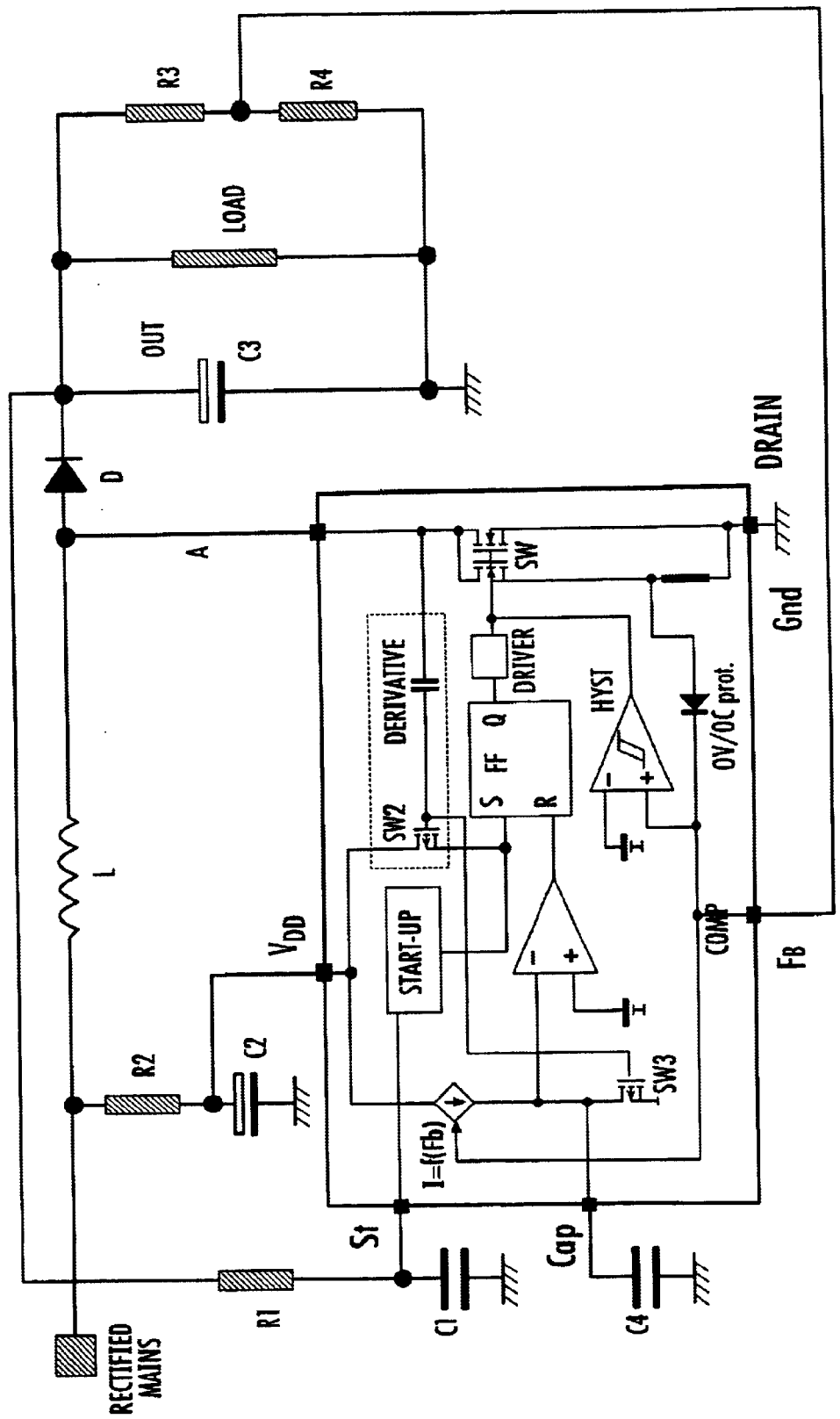
FIG. 8 is a circuit diagram of a converter using the integrated device of FIG. 7.

The integrated device of FIG. 7 may be used to form a power supply similar to that of FIG. 5a, as depicted in FIG. 8, or similar to that of FIG. 5b. Optionally, the integrated device of the invention may also comprise, as shown in the figures, a start-up circuit START-UP that generates a set pulse for the bistable circuit when a pre-established maximum time has elapsed from the last reset pulse without the block DERIVATIVE generating any set pulse. This maximum time interval is determined by the capacitance C1 and by the resistance R1 connected to the dedicated pin ST of the device as shown.

According to the embodiment shown, a turn off circuit for the switch SW includes a comparator COMP and a switch SW3 for generating a reset pulse for the bistable circuit FF after a pre-established time from the last generated set pulse (fixed turn-on time $T_{ON}$). This pre-established time is determined by the capacitance of the capacitor C4 connected to the pin CAP of the device as shown, and by the charging current I. Substantially, when a negative derivative signal is applied to the gate of the switch SW2 in the differentiating block DERIVATIVE, it also switches a third switch SW3 for discharging the capacitor C4. When the voltage on the nodes of the capacitor C4 drops below a pre-established threshold, the comparator COMP generates a reset pulse (R) for the flip-flop FF that turns off the power switch SW.

A hysteresis comparator HYST receives a feedback signal that is fed to the dedicated pin FB. The feedback signal is representative of the output voltage that is provided to the load. The comparator HYST turns off and on the power switch SW when the feedback signal respectively surpasses the upper and lower thresholds.

In the shown embodiment, the feedback signal is also used to regulate the charging current I of the capacitor C4 to vary the turn on time of the power switch SW as a function of load conditions. The feedback signal can be customarily tapped from a resistive voltage divider R3, R4 connected in parallel to the load LOAD, as depicted in FIG. 8.

Optionally, the driving circuit of the invention may also be provided, according to a common technique, for a blanking circuit (not depicted in FIG. 7) connected between the output of the comparator COMP and the reset input R of the flip-flop FF in order to mask the noise due to the switching of the power switch SW.

That which is claimed is:

1. A method for detecting a null current condition in a PWM driven inductor connected in series between a voltage source node and a second node of a line outputting current to a load, the method comprising:
   generating a derivative signal by time differentiating a voltage on the second node;
   monitoring when the derivative signal becomes negative; and
   signaling verification of the null current condition in the inductor each time the derivative signal becomes negative.

2. A method according to claim 1, further comprising filtering the voltage on the second node before generating the derivative signal.

3. A method according to claim 1, wherein a power switch is connected between the second node and a voltage reference; and a PWM control circuit is connected to the power switch for control thereof based upon load conditions of the load, the PWM control circuit comprising a bistable output stage connected to a control terminal of the power switch, and a time differentiating circuit connected to the second node for performing the generating, monitoring and signaling.

4. A method according to claim 3, wherein the signaling comprises generating a set pulse for setting the bistable output stage.

5. A method according to claim 4, wherein the time differentiating circuit comprises:
   a second switch for switching a set input of the bistable stage to a supply voltage; and
   a capacitor connected between the second node and a control terminal of the second switch.

6. A method according to claim 3, wherein the PWM control circuit further comprises a turn-off circuit for the power switch, the turn-off circuit for generating a reset pulse for the bistable output stage after a pre-established time from the setting of the bistable output stage.

7. A method according to claim 3, wherein the PWM control circuit further comprises a start-up circuit for generating a set pulse for the bistable stage when a pre-established time has elapsed from a last reset pulse without the time differentiating circuit having to set the bistable output stage.

8. A method according to claim 3, wherein the PWM control circuit also generates a feedback signal from the load, and provides the feedback to a hysteresis comparator for forcing the power switch in a conduction state if the feedback signal drops below a threshold.

9. A method according to claim 3, wherein the voltage reference is ground.

10. An integrated PWM driving circuit for detecting a null current condition in an inductor connected in series between a voltage source node and a second node of a line outputting current toward a load, the integrated PWM driving circuit comprising:
a power switch connected between the second node and a voltage reference; and
a PWM control circuit connected to said power switch for control thereof based upon load conditions of the load, said PWM control circuit comprising
a bistable output stage connected to a control terminal of said power switch, and
time differentiating circuit means connected to the second node for performing time differentiation and generating a pulse for setting said bistable output stage when a voltage on the second node drops.

11. An integrated PWM driving circuit according to claim 10, wherein said time differentiating circuit means comprises:
a second switch for switching a set input of said bistable stage to a supply voltage; and
a capacitor connected between the second node and a control terminal of said second switch.

12. An integrated PWM driving circuit according to claim 10, wherein said PWM control circuit further comprises a turn-off circuit for said power switch, said turn-off circuit for generating a reset pulse for said bistable output stage after a pre-established time from the setting of said bistable output stage.

13. An integrated PWM driving circuit according to claim 10, wherein said PWM control circuit further comprises a start-up circuit for generating a set pulse for said bistable stage when a pre-established time has elapsed from a last reset pulse without said time differentiating circuit means having to set said bistable output stage.

14. An integrated PWM driving circuit according to claim 10, wherein said PWM control circuit further comprises:
a feedback pin for receiving a feedback signal from the load; and
a hysteresis comparator having an input for receiving the feedback signal for forcing said power switch in a conduction state if the feedback signal drops below a threshold.

15. An integrated PWM driving circuit according to claim 10, wherein the voltage reference is ground.

16. A boost converter for a load and comprising:
an inductor connected to an input node for receiving a rectified mains voltage;
a clamping diode connected between said inductor and an output node;
a capacitor connected between the output node and a voltage reference; and
an integrated PWM driving circuit for detecting a null current condition in said inductor, and comprising
a power switch having a first conducting terminal connected to an intermediate node between said inductor and said clamping diode, and a second conducting terminal connected to the voltage reference,
a PWM control circuit connected to said power switch for control thereof as a function of load conditions of the load, said PWM control circuit comprising
a bistable output stage connected to a control terminal of said power switch for turning on said power switch when current in said inductor becomes null, and
a time differentiating circuit connected to the second node for performing time differentiation and generating a set pulse for setting said bistable output stage when a voltage on the second node drops.

17. A boost converter according to claim 16, further comprising a monitoring circuit for monitoring the load conditions, and for generating a feedback signal for said driving circuit based upon the monitored load conditions.

18. A boost converter according to claim 17, wherein said monitoring circuit comprises a resistive voltage divider connected between the output node and the voltage reference, the feedback signal being a scaled replica of an output voltage on the output node.

19. A boost converter according to claim 16, wherein the voltage reference is ground.

20. A boost converter according to claim 16, wherein a DC voltage is generated on the output node.

21. A power supply comprising:
a rectifying bridge to be connected to a mains voltage;
a capacitor connected between an output node and a voltage reference; and
a boost converter connected between said rectifying bridge and said capacitor, and comprising
an inductor connected to said rectifying bridge for receiving a rectified mains voltage,
a clamping diode connected between said inductor and the output node, and
an integrated PWM driving circuit for detecting a null current condition in said inductor, and comprising
a power switch having a first conducting terminal connected to an intermediate node between said inductor and said clamping diode, and a second conducting terminal connected to the voltage reference,
a PWM control circuit connected to said power switch for control thereof as a function of load conditions of a load connected to the output node, said PWM control circuit comprising a bistable output stage connected to a control terminal of said power switch for turning on said power switch when current in said inductor becomes null, and
a time differentiating circuit connected to the second node for performing time differentiation and generating a set pulse for setting said bistable output stage when the voltage on the second node drops.

22. A power supply according to claim 21, further comprising a monitoring circuit for monitoring the load conditions, and for generating a feedback signal for said driving circuit based upon the monitored load conditions.

23. A power supply according to claim 22, wherein said monitoring circuit comprises a resistive voltage divider connected between the output node and the voltage reference, the feedback signal being a scaled replica of an output voltage on the output node.

24. A power supply according to claim 21, wherein the voltage reference is ground.

25. A power supply according to claim 21, wherein a DC voltage is generated on the output node.

* * * * *